Dec. 1, 1936.  G. C. PAXTON  2,062,604
BOX SWITCHING UNIT
Filed May 31, 1935   3 Sheets-Sheet 1

INVENTOR
GERALD C. PAXTON
BY
ATTORNEY

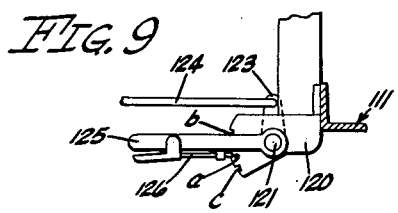
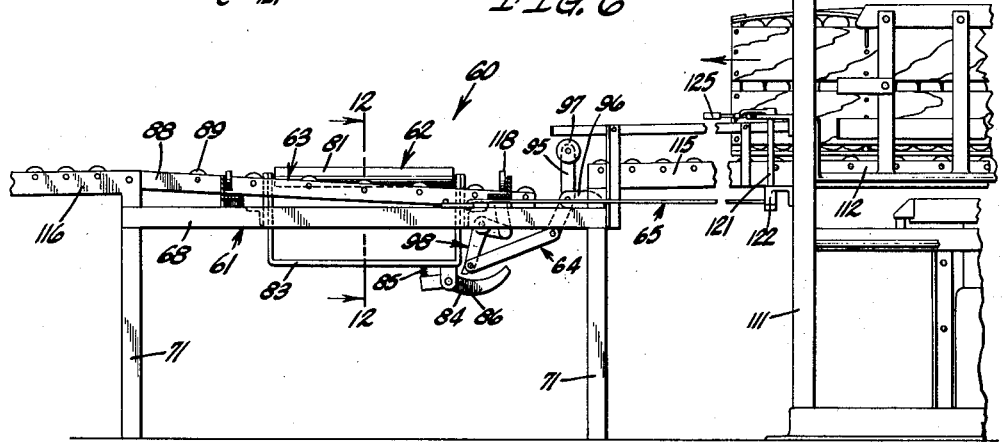
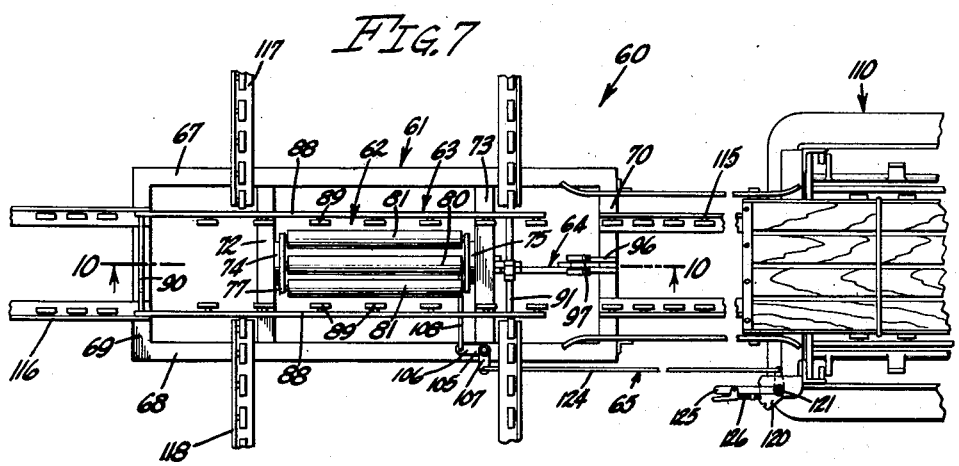
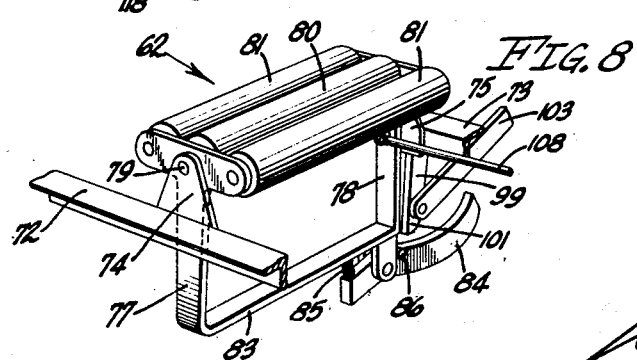

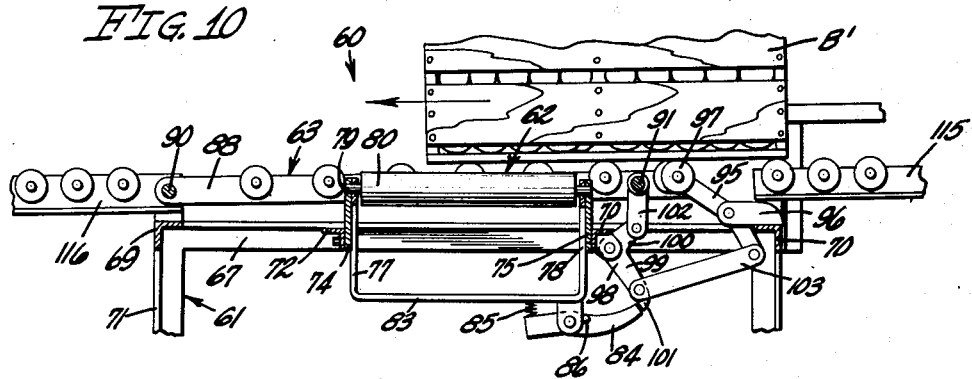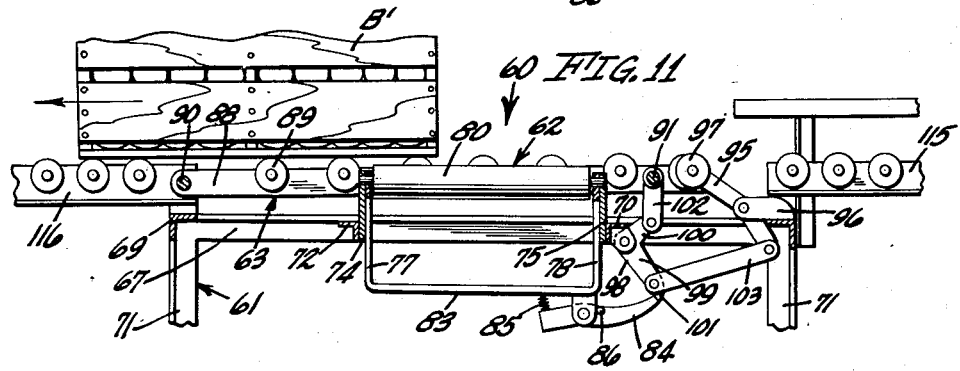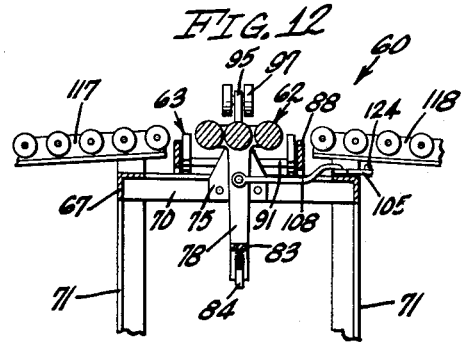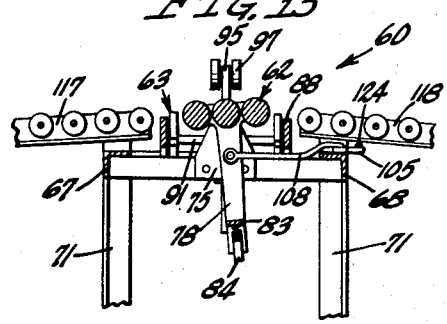

Patented Dec. 1, 1936

2,062,604

UNITED STATES PATENT OFFICE 2,062,604

BOX SWITCHING UNIT

Gerald C. Paxton, Santa Ana, Calif., assignor, by mesne assignments, to Food Machinery Corporation, a corporation of Delaware Application May 31, 1935, Serial No. 24,189

14 Claims. (Cl. 193—36)

My invention relates to article conveyors and has particular reference to a box switching unit for use in fruit and vegetable packing houses.

Agricultural produce is usually packed in boxes or crates for shipment, these containers being rectangular in shape. After being packed, the boxes are carried by conveyors to machines for applying lids thereto, the boxes usually being carried to and from the lidding machines in a line of travel parallel with the longitudinal axes of the boxes. After being discharged from the lidding machine, the boxes are usually stored temporarily on an idle conveyor before being trucked to box cars or stacked prior to shipment. It is desirable that the boxes be placed side by side rather than end to end on the idle conveyors so as to conserve longitudinal space on the conveyor.

Accordingly, an object of my invention is to provide a suitable switching unit for receiving a box endwise and discharging said box sideways onto said storage conveyor.

In the packing of fruit for shipment, the fruit is sized and packed so that each box contains fruit of uniform size. The boxes are conveyed to a lidding machine in irregular order and after being lidded and discharged onto a storage conveyor, it is necessary to segregate the boxes as to the size of fruit contained therein.

Accordingly, an object of my invention is to provide a box switching unit to receive boxes from a lidding machine and discharge said boxes onto any one of a plurality of storage conveyors.

Another object of my invention is to provide an extremely simple and reliable unit for changing the direction of travel of a box at any point in a packing house conveying system.

Other objects and advantages will be made manifest in the following description taken in connection with the accompanying drawings, in which:

Fig. 1 is a plan view of a preferred embodiment of my invention.

Fig. 2 is a longitudinal sectional view taken on the line 2—2 of Fig. 1.

Figs. 3 and 4 are views similar to Fig. 2, showing the operation of the preferred embodiment of my invention.

Fig. 5 is a vertical sectional view taken on the line 5—5 of Fig. 4.

Fig. 6 is a front elevational view of a modified form of my invention positioned to receive boxes from a box lidding machine.

Fig. 7 is a plan view of the apparatus shown in Fig. 6.

Fig. 8 is a detail perspective view of a portion of the modified form of my invention.

Fig. 9 is an enlarged, detail view of a portion of the mechanism shown in Fig. 7.

Figs. 10 and 11 are enlarged, longitudinal sectional views taken on the line 10—10 of Fig. 7, showing the operation of a portion of the mechanism disclosed therein.

Fig. 12 is an enlarged, transverse sectional view taken on the line 12—12 of Fig. 6.

Fig. 13 is a view similar to Fig. 12, showing the operation of a portion of the mechanism disclosed therein.

Referring specifically to Figs. 1 to 5 inclusive of the drawings, a box switching unit 10 comprising one embodiment of my invention is shown in Fig. 1, this unit including a frame 11, a discharge conveyor 12, a receiving conveyor 13 and a receiving conveyor control mechanism 14.

The frame 11 includes longitudinal members 15 and 16 joined at their ends by transverse members 17 and 18. Extending downward from the four corners of the frame 11 are suitable legs 19. Extending between the longitudinal frame members 15 and 16 are parallel transverse members 20 and 21.

The discharge conveyor 12 includes an upstanding plate 24 fixed to each of the transverse frame members 20 and 21. Rotatably mounted between the plates 24 are idle rollers 25 and 26, the roller 25 being positioned slightly above the roller 26 as shown in Fig. 5.

The receiving conveyor 13 includes a pair of parallel bars 30 pivoted at one end thereof to suitable lugs 31 provided on the transverse member 17 of the frame 11. Fixed to the bars 30 between the free ends thereof is a cross bar 33 and rotatably mounted on each of the bars 30 are idle rollers 34.

The control mechanism 14 includes a lever 36 fulcrumed on a suitable bifurcated bracket 37 on the transverse frame member 18. Rotatably mounted on the upper extremity of the lever 36 are idle rollers 38. Pivoted on the transverse frame member 21 is a bell crank 40 having arms 41 and 42, the arm 41 being connected to the lower end of the lever 36 by a link 44 and the arm 42 being connected by a link 45 to the bar 33 of the receiving conveyor 13.

Mounted on the transverse frame member 18 is a box conveyor 50, there being guide rails 51 and 52 at each side of the conveyor 50, the rail 52 extending over the unit 10 as shown in Fig. 1. Mounted on the longitudinal member 15 of the frame 11 is an inclined box conveyor 54. The conveyors 50 and 54 may be of any design.

*Operation of switching unit 10*

The receiving conveyor 13 is normally disposed in the position shown in Fig. 2, the bars 30 resting on the frame member 21. When the conveyor 13 is in this position, the lever 36 is disposed vertically in the path of a box B. When the box B rolls onto the unit 10, the rollers 38 of the lever 36 are engaged by the end of the box causing the lever 36 to swing to the position in which it is shown in Fig. 3. This actuation of the lever 36 rocks the bell crank 40, causing the conveyor 13 to be raised into horizontal alignment with the box conveyor 50. The box B, continuing its travel, rolls onto the raised conveyor 13. When the box B passes over the lever 36, the latter is freed, allowing the receiving conveyor 13 to drop to its downward position thus leaving the box B resting on the discharge conveyor 12 as shown in Figs. 4 and 5. Frictional engagement of the box with the rollers 26 halts the forward movement of the box and the box then rolls off of the incline of conveyor 12 onto the conveyor 54 to be conveyed to any desirable destination.

Referring now to Figs. 6 to 13 inclusive of the drawings, I have shown therein a modified form of box switching unit 60, this unit including a frame 61, a discharging conveyor 62, a receiving conveyor 63, a receiving conveyor control mechanism 64 and a discharging conveyor control mechanism 65.

The frame 61 includes longitudinal members 67 and 68 joined at their ends by transverse members 69 and 70. Provided at each corner of the frame 61 is a leg 71. Extending transversely between the members 67 and 68 are frame members 72 and 73 having upstanding apertured plates 74 and 75 respectively fixed thereto as seen in Fig. 8.

The discharging conveyor 62 includes a pair of T-shaped end members 77 and 78, these being pivotally mounted on the plates 74 and 75 by means of a suitable pin 79. Rotatably mounted on the pin 79 between the members 77 and 78 is a roller 80, there being a similar roller 81 rotatably mounted at each side of the roller 80. Connecting the lower ends of the members 77 and 78 is a horizontal cross-bar 83 having a latch bar 84 pivotally mounted on the under side thereof. The bar 84 is yieldably held in the position in which it is shown in Fig. 8 by a compression spring 85 and stop pin 86. The function of the latch bar 84 will be described hereinafter.

The receiving conveyor 63 includes a pair of bars 88 having rollers 89 thereon. Provided on the cross member 69 of the frame 61 is a bar 90 upon which one end of each of the bars 88 is pivoted. Joining the free ends of the bars 88 is a cross bar 91.

The receiving conveyor control mechanism 64 includes a lever arm 95 pivoted on a bifurcated bracket 96 on the frame member 70. Rotatably mounted on the upper end of the lever 95 is a pair of rollers 97. Pivotally mounted on the transverse frame member 73 is a bell crank 98 having arms 99 and 100, the arm 99 having a tooth 101 on its lower extremity. Connecting the arm 100 of the bell crank 98 with the bar 91 of the receiving conveyor 63 is a link 102, a similar link 103 connecting the arm 99 of the bell crank 98 with the lower extremity of the lever 95. The discharging conveyor control mechanism 65 includes a bell crank 105 having arms 106 and 107, the crank 105 being pivotally mounted on the longitudinal member 68 of the frame 61 as shown in Fig. 7. Connecting the arm 106 of the bell crank 105 with the member 78 of the discharging conveyor 62 is a link 108.

The box switching unit 60 is shown in Figs. 6 and 7 in position to receive boxes from a box lidding machine 110, the latter being similar to the machine disclosed in the copending application of Hale Paxton et al., Serial No. 688,104, filed September 5, 1933, for Automatic lid nailing and strapping machines.

The lidding machine 110 includes a frame 111 in which a vertically movable nailing table 112 is mounted. Extending from the machine 110 to the box switching unit is an idle box conveyor 115, and extending from the switching unit 60 is a longitudinal box conveyor 116 and lateral conveyors 117 and 118.

Mounted on the frame 111 of the lidding machine 110 is an apertured plate 120 having a vertical shaft 121 journaled therein, the lower end of the shaft 121 being supported by a suitable bearing 122. Fixed on the lower end of the shaft 121 is an arm 123 as seen in Fig. 9, the arm 123 being connected to the arm 107 of the bell crank 105 by a rod 124. Fixed to the upper end of the shaft 121 is a lever 125, the latter having a latch 126 thereon adapted to engage any one of three notches *a*, *b* and *c* as seen in Fig. 9.

*Operation of switching unit 60*

Prior to, or during the lidding of a box in the machine 110, the operator takes note of the size of fruit contained in the box. If the box at hand such as box B' is to be delivered to the conveyor 116, the lever 125 is positioned centrally as shown in Fig. 7, with the latch 126 in engagement with the notch *a*. When the lever 125 is so positioned, the discharging conveyor 62 is disposed horizontally as shown in Fig. 11. As the box B' rolls down the conveyor 115, the lever 95 is swung to the position in which it is shown in Fig. 10, the bell crank 98 is actuated causing the box receiving conveyor 63 to be raised to the position in which it is shown in Fig. 10. When the bell crank 98 is actuated, the tooth 101 of arm 99 snaps over the end of the latch arm 84. When the box B' rolls from the receiving conveyor 63 onto the conveyor 116, the conveyor 63 is retained in its uppermost position by the latch arm 84 as shown in Fig. 11.

When the operator wishes to deliver a box to the lateral conveyor 117, the lever 125 is pushed rearward until the latch 126 engages the notch *b* of plate 120. Rotation of the shaft 121 swings the lever 123, pulls on the rod 124, and rotates the bell crank 105, the latter pulling on the rod 108 and inclining the discharging conveyor 62 to the position in which it is shown in Fig. 13. When the conveyor 62 is inclined in this manner, the latch bar 84 is swung out of alignment with the arm 99 of the bell crank 98. When the box to be delivered to the conveyor 117 rolls onto the unit 60, the lever 95 is swung to the position shown in Fig. 10, and when the box passes over the lever 95, the latter returns to normal position due to the fact that the latch bar 84 is out of alignment with the arm 99. As the lever 95 returns, the receiving conveyor 63 returns to lowermost position, the box being allowed to rest on the discharging conveyor 112. From the inclined conveyor 62, the box rolls onto the conveyor 117.

When desirable to deliver a box to the lateral conveyor 118, the operator pulls the lever 125 forward until the latch 126 thereof engages the notch c of the plate 120. This inclines the conveyor 62 toward the lateral conveyor 118, a box being delivered to the conveyor 118 in the same manner as described relative to the delivery of a box to the other lateral conveyor 117.

Although I have shown and described but one preferred and one modified form of my invention, it is understood that many modifications and changes might be made therein without departing from the spirit of the invention or the scope of the appended claims.

I claim as my invention:

1. In a box switching unit, the combination of: a frame; a primary conveyor on said frame for receiving a box in a given line of travel; a secondary conveyor on said frame for discharging said box from said unit in a different line of travel, said secondary conveyor being normally disposed above the level of said primary conveyor; and control means on the receiving end of said frame responsive to the approach of said box to said switching unit to cause relative vertical movement between said conveyors to reverse the relative vertical positions of said conveyors and thus allow said primary conveyor to receive said box, said control means causing a return to said normal vertical relation between said conveyors in response to the arrival of said box on said switching mechanism and thus causing said box to be discharged from said switching unit by said secondary conveyor.

2. In a box switching unit, the combination of: a frame; a primary conveyor on said frame for receiving a box delivered to said switching unit in a given line of travel, said primary conveyor being movable vertically; a secondary conveyor on said frame for discharging said box from said switching unit in a different line of travel, said primary conveyor being normally disposed below the level of said secondary conveyor; and control means on the receiving end of said frame for raising said primary conveyor in response to the approach of said box to said unit, said control means causing said primary conveyor to move downward to said normal position upon the arrival of said box on said switching unit, said box being received by said secondary conveyor and discharged from said switching unit in response to said downward movement of said primary conveyor.

3. In a box switching unit, the combination of: a frame; a primary conveyor on said frame for receiving a box in a given line of travel; a secondary conveyor on said frame for discharging said box from said unit in a different line of travel, said secondary conveyor being normally disposed above the level of said primary conveyor; a lever pivotally mounted on said frame on the box receiving end thereof, one end of said lever extending into the path of said box; and mechanical means responsive to actuation of said lever by said box to cause relative vertical movement between said conveyors to reverse the relative positions of said conveyors and thus allow said primary conveyor to be disposed above the level of said secondary conveyor in box receiving position, said conveyors returning to said normal vertical relation when said box passes out of contact with said lever, said box being discharged from said unit by said secondary conveyor in response to return of said conveyors to said normal vertical relation.

4. In a box switching unit, the combination of: a frame; a box receiving conveyor extending longitudinally on said frame; a box discharging conveyor extending transversely on said frame; said receiving conveyor being normally disposed below the level of said discharge conveyor and movable vertically to a position above the level of said discharge conveyor; a lever pivoted on said frame at the box receiving end thereof, an end of said lever extending into the path of a box being delivered to said unit; and mechanical means responsive to actuation of said lever by said box to raise said receiving conveyor to its uppermost position to permit said receiving conveyor to receive said box, said receiving conveyor being maintained in said uppermost position during contact of said lever with said box, said receiving conveyor returning to said normal position in response to disengagement of said box and said lever, said box being discharged from said unit by said discharge conveyor in response to downward movement of said receiving conveyor.

5. In a box switching unit, the combination of: a frame; a delivery conveyor for delivering a box to said switching unit; a box conveyor extending laterally from each side of said frame; a primary box receiving conveyor on said frame for receiving a box from said delivery conveyor; a secondary conveyor on said frame normally disposed above the level of said primary conveyor for discharging said box laterally from said unit, said secondary conveyor being inclinable toward either of said lateral box conveyors; control means responsive to delivery of a box to said unit to cause relative vertical movement between said primary and said secondary conveyors to reverse the relative vertical positions of said conveyors and thus allow said primary conveyor to receive said box, said control means allowing said primary and secondary conveyors to return to said normal relation in response to arrival of said box on said unit, said box being delivered by said secondary conveyor to the one of said lateral conveyors toward which said secondary conveyor is inclined.

6. In a box switching unit, the combination of: a frame; a box receiving conveyor extending longitudinally of said frame; a box discharging conveyor extending transversely of said frame, said receiving conveyor being movable vertically, said discharging conveyor being pivotally mounted about a horizontal axis, said axis extending longitudinally relative to said frame; manual control means for retaining said discharging conveyor in horizontal position or inclining said discharging conveyor toward either side of said frame; a delivery conveyor at one end of said frame for delivering a box to said receiving conveyor; automatic control means responsive to the delivery of said box to raise said receiving conveyor above the level of said discharging conveyor; latch means on said discharging conveyor to retain said receiving conveyor in elevated position when said discharging conveyor is in horizontal position to permit said receiving conveyor to convey said box from said delivery conveyor to box receiving means at the opposite end of said switching unit, said latch means being inoperative when said discharging conveyor is disposed in inclined position, said automatic control means allowing said receiving conveyor to return to lower position below the level of said discharging conveyor in response to arrival of said box on said unit when said discharging conveyor is in inclined position, said box being discharged laterally from said unit by said discharging conveyor in the direction that said discharging conveyor is inclined.

7. In a box switching unit, the combination of: a frame; a primary conveyor on said frame for receiving a box travelling in a given direction; a secondary conveyor in said frame for discharging said box from said unit in a substantially different direction; means for causing relative vertical movement between said conveyors to transfer a box from said primary conveyor onto said secondary conveyor; and a control for said means, said control being disposed in the path of a box about to be received by said unit so as to be engaged by said box to cause relative vertical movement between said conveyors to present said primary conveyor in a superior or receiving position relative to said secondary conveyor, said control, when passed over by said box, acting on said means to cause relative vertical movement between said conveyors to present said secondary conveyor in a superior or receiving position relative to said primary conveyor, said secondary conveyor thereupon assuming the burden of supporting said box and conveying same in said different direction.

8. A combination as in claim 7 in which power for actuating the aforesaid means for causing relative vertical movement between said conveyors is derived from the box approaching the switching unit and is transmitted to said means through said control.

9. A combination as in claim 7 in which said secondary conveyor is inclined to cause a gravity discharge therefrom of said box immediately upon the assumption by said secondary conveyor of the burden of supporting said box.

10. A combination as in claim 7 in which said secondary conveyor is adjustable as to tilt to permit a choice from among two directions in which said secondary conveyor is to discharge said box.

11. A combination as in claim 7 having latch means for optionally maintaining a vertical relation between said conveyors in which said primary conveyor is superiorly disposed relative to said secondary conveyor as the box travels past the aforesaid control, thus causing the box to continue through said switching unit in the aforesaid given direction.

12. A combination as in claim 7 having latch means for optionally maintaining a vertical relation between said conveyors in which said primary conveyor is superiorly disposed relative to said secondary conveyor as the box travels past the aforesaid control, thus causing the box to continue through said switching unit in the aforesaid given direction; and in which said secondary conveyor is tiltable to cause the gravity discharge of boxes coming to rest thereon in either of two substantially opposite directions, the positioning of said secondary conveyor in a substantially neutral or horizontal position rendering said latch means operative.

13. In a conveyor system, a combination of a longitudinal conveyor; a transverse conveyor at right angles thereto; primary and secondary conveyor switch sections disposed in the area in which said conveyors intersect; and box actuated means causing relative vertical movement between said sections to present said primary section unincumbered by said secondary section and in the path of a box approaching said intersection on said longitudinal conveyor so that said box is received upon said primary section, said last-mentioned means being gravity responsive to transfer said box from said primary section to said secondary section when said box arrives within said intersection, said secondary section then discharging said box on the said transverse conveyor.

14. A combination as in claim 13 in which a second transverse conveyor is provided on the opposite side of said intersection from said first-mentioned transverse conveyor and in which said secondary switch conveyor section may be optionally disposed in inclined position to discharge the box resting thereon by gravity onto either of said transverse conveyors.

GERALD C. PAXTON.